United States Patent [19]

Meyer

[11] Patent Number: 4,518,955
[45] Date of Patent: May 21, 1985

[54] METHOD AND APPARATUS FOR DETECTING LEAKAGE IN A FLUID CONDUIT SYSTEM

[76] Inventor: Knut Meyer, 2960, Rungsted Kyst, Denmark

[21] Appl. No.: 374,799

[22] Filed: May 4, 1982

[30] Foreign Application Priority Data

May 6, 1981 [DK] Denmark .............................. 2007/81

[51] Int. Cl.³ ........................ G08B 19/00; F16K 17/00
[52] U.S. Cl. ..................................... 340/605; 137/460; 137/487.5
[58] Field of Search ............................... 340/605, 606; 73/40.5 R, 861.53; 364/510; 137/460, 551, 487.5, 459; 200/81.9 M, 81.9 R

[56] References Cited

U.S. PATENT DOCUMENTS

| | | | |
|---|---|---|---|
| 3,392,580 | 7/1968 | Bain et al. | 340/606 X |
| 3,624,627 | 11/1971 | Evans | 73/40.5 R |
| 4,081,635 | 3/1978 | Moore | 200/81.9 M |
| 4,108,088 | 12/1979 | Mallett | 137/487.5 |

FOREIGN PATENT DOCUMENTS 2080 1/1906 United Kingdom ................ 340/605

Primary Examiner—James J. Gill
Attorney, Agent, or Firm—Dennison, Meserole, Pollack & Scheiner

[57] ABSTRACT

Leakage in a conduit system is detected by means of a fluid flow detector and evaluated by means of a control device on the basis of predetermined criteria. When the control device, which may include a microcomputer has received a signal from the flow detector indicating that fluid is flowing through the conduit system the control device operates an alarm device and/or closes the fluid supply by means of a valve, if the fluid flow is condidered to be caused by a leak or break in the conduit system evaluated on the basis of the time at which the flow takes place, the duration of the detected flow, the intensity of the detected flow, and/or information about whether the fluid drains of the conduit system are closed. The conduit system may, for example, be a conduit system for supply of water or gas to apartment houses and one-family houses, but may also form parts of industrial plants. The above mentioned method makes it possible to obtain a quick detection of leaks in hidden as well as unexposed conduits or tubes without the presence of persons being necessary, whereby the risk of damages due to leaks may be substantially reduced.

9 Claims, 6 Drawing Figures

METHOD AND APPARATUS FOR DETECTING LEAKAGE IN A FLUID CONDUIT SYSTEM

BACKGROUND OF THE INVENTION

1. Field of the Invention

The present invention relates to a method of detecting a leakage in a conduit system communicating with a supply source of pressurized fluid to be consumed and having at least one selectively operatable fluid drain. Examples of such conduit systems are water and gas supply conduits in apartment houses, one-family houses, and other buildings. However, the conduit system in question may also be used for conducting other liquid and gaseous fluids, for example in industrial plants.

A leakage in such conduit system not only results in loss of the fluid conducted within the conduit system, but the leakage fluid may also cause very extensive damages on the surroundings, for example as damage by water or moisture, or damage by explosion or corrosion. Therefore, in order to limit the risk of damage or the extent of the damage it is very important that a possible leakage in a conduit system is discovered as quickly as possible so that the necessary steps to tighten or repair the conduit system may be taken.

When the conduit system is totally or partly covered or hidden, which is normally the case for example in apartment houses and one-family houses, it is almost impossible to discover even a greater leakage sufficiently quickly to avoid damages. Even when the conduit system is directly available for inspection, it may be difficult to discover smaller leakages, especially in a gas conducting conduit, and in time periods, for example at night or in weekends, when no persons are present even great leakages will not be discovered.

2. Description of the Prior Art

It is known to add scenting substances to gaseous fluids in conduit systems in order to facilitate detection of leakages in the systems. However, a condition for detecting a leakage in a conduit system in this manner is that one or more persons is/are present at any time to survey the conduit system, and in most cases this is not possible in practice.

SUMMARY OF THE INVENTION

The present invention provides a method of the above type permitting a quick and effective detection of a possible leakage in a conduit system and an immediate action in order to avoid or reduce the damaging effect.

The present invention provides a method of detecting a leakage in a conduit system communicating with a supply source of a pressurized fluid to be consumed and having at least one selectively operatable fluid drain, said method comprising detecting at at least one location of the conduit system a possible fluid flow therein exceeding a predetermined value by means of a flow detector, supplying a detecting signal from said flow detector to a control device when such fluid flow has been detected, evaluating by means of said control device in response to its receipt of a detecting signal on the basis of predetermined criteria whether the flow detected should be considered permissible, and, if not, activating an alarm device and/or interrupting the communication between the supply source and the conduit system, at least one of said predetermined criteria being selected from the group consisting of the time of receipt of the detecting signal, the duration of the flow detected, the intensity of the flow detected, and information about the condition of the fluid drains.

In a conduit system of the type in question smaller fluid flows may occur even if the fluid drains are closed, and even if there is no leakage in the system. Such flows may be caused by pressure variations at the supply source in combination with the inherent elasticity of the conduit system being surveyed and by temperature variations of the conduit systems or parts thereof. In water supply systems it may for example also be desirable to permit a certain smaller leakage at the water drains. The maximum fluid flow, which may occur in the conduit system due to the above circumstances when none of the fluid drains is open, may be chosen as the said predetermined value of the fluid flow. If the actual fluid flow in the conduit system exceeds this value it may be concluded that either fluid is drained from the conduit at the fluid drains or an non-permissible leakage is present in the system. At certain times of the day, for example at night, it may be very unlikely that fluid is drained at the fluid drains, and therefore it may possibly be concluded that a leak is present in the conduit system if the actual fluid flow at such time of the day exceeds the said predetermined value. In most cases draining of fluid at any of the fluid drains is of a relatively short duration, and a maximum fluid draining period, which is normally not exceeded may then be fixed based on experience or empirical data. If in such case the flow detector detects a volume flow or flow rate exceeding the said predetermined value within a continuous period of time which exceeds the said maximum period of time for fluid drainage, it is most likely that a leak is present in the system. Furthermore, by detecting a flow with an intensity exceeding that occurring when fluid is simultaneously drained from the maximum number of liquid drains of the system it may immediately be concluded that the conduit system most likely contains a break. Finally, the said evaluation of the permissibility of a detected flow may be based on information about the condition of the fluid drains. If, for example, fluid is drained only from one fluid drain and the intensity of the detected flow substantially exceeds the flow which may be caused by such fluid draining, it may be concluded that a leak or break is to be found in the system. However, it is more safe to make the evaluation at a time at which all fluid drains are closed according to information received. If a flow exceeding the said predetermined value is detected in such case it may be concluded that a leak or break is to be found in the system. It should be understood that any combination of the above mentioned evaluation methods may be used. When a detected flow is evaluated as non-permissible because it most probably is totally or partly caused by a leak or break, an alarm device, such as a light or sound signal, is activated so as to call in persons which may take the necessary steps, and/or the communication between the fluid supply source and the conduit system may automatically be disconnected so that damage may be prevented or reduced.

In most cases fluid drainage from a conduit system of the type in question, such as drainage of water from water supply lines or drainage of gas from gas supply lines in a one-family house, is of a relatively short duration which means that each drainage period normally only comprises a small fraction of 24 hours. In such cases it is possible to evaluate a detected fluid flow as non-permissible, because it is presumed to be caused by a leakage in the conduit system if the duration of the flow exceeds a predetermined period of time exceeding the duration of the normally maximum continuous fluid drainage period. In cases where fluid is drained over a continuous period exceeding the presumed maximum drainage period, for example if a lawn is to be sprinkled, the leak surveying system may be put out of operation for a predetermined period of time in order to avoid false alarming.

As mentioned above, the most safe method of detecting a possible leak is an evaluation of the permissibility of a fluid flow when it is certain that all fluid drains are closed. In cases where the fluid drains are opened very frequently there is a risk that not all of the fluid drains will be closed for a long period of time so that a sufficiently frequent detection of possible leaks cannot be made in the above manner. In order to make it possible to make such detection at certain predetermined intervals it is preferred to close all fluid drains in a short period of time at predetermined hours or at predetermined time intervals, and a detected fluid flow exceeding the said predetermined value during such closure is then evaluated as non-permissible.

The invention also relates to a system for detecting leaks in a conduit system, which communicates a supply source of a pressurized fluid to be consumed, and comprising at least one selectively operatable fluid drains, one or more fluid flow detectors each being adapted to generate a detecting signal when the fluid flow at the respective location of the conduit system exceeds a predetermined value, and a control device which is connected to the flow detector or detectors and adapted to control the operation of an alarm device and/or a closure valve positioned between the supply source and the conduit system, in response to signals received from the flow detector or detectors and on the basis of predetermined criteria coded into the control device. This control may be of the electronic, hydraulic, pneumatic, or mechanical type, and it may be adapted to evaluate the detecting signal from the flow detector or detectors on the basis of one of the above criteria, or on the basis of a combination of two or more of these criteria. As an example, the system may comprise closure valves arranged at the respective fluid drains of the conduit system, and the control device may be adapted to close all these valves simultaneously and for a short period at predetermined hours or at predetermined time intervals. When all fluid drains have been closed the fluid flow is sensed at one or more positions in the conduit system, and the fluid flow is evaluated as non-permissible which means that the system is meant to contain a leak, if the fluid flow at the respective position exceeds the said predetermined value which may be caused by variations in the pressure of the supply source and/or temperature variations of the conduit system.

The flow detectors used in connection with the system according to the invention may be of the known type comprising a valve member or piston which is displaceably arranged within a cylinder and which is biased by a return member in a direction opposite to the normal direction of fluid flow in the conduit system into engagement with a shoulder or seat formed within the cylinder, and a first piston position detector for detecting the position of the piston within the cylinder. According to the invention, the flow detector may also comprise a second piston position detector for detecting when the piston has been moved away from the seat to another position at which the cross-sectional area of the cylinder opening exceeds the cross-sectional area at the first position.

If a fluid flow is caused within the conduit system including the flow detector the valve member or piston is moved against the bias of the return member a certain distance away from its seat depending on the flow intensity. By adapting and correcting the bias of the return member, the space defined between the outer periphery of the piston and the inner wall of the cylinder, and the position of the piston position detectors, it may be obtained that fluid flows in the conduit system due to pressure variations of the supply source, elasticity of the walls of the conduit system, and temperature variations in the conduit system cause that the piston or valve member is moved only out of engagement with its seat, but not moved to the first piston position detector. Only when a smaller leak in the conduit system occurs or fluid is drained from the conduit system at a relatively small rate the piston or valve member is moved such a distance away from its seat that it is positioned between the two piston position detectors, and when fluid is drained from the conduit system at a high rate or a break occurs in the conduit system, the piston or valve member is moved to and past the other piston position detector to a position where the cylinder opening has an increased cross-sectional area. If desired, the flow detector may be dimensioned in such a manner that normal draining of fluid from the fluid drains is not in itself sufficient to cause movement of the piston to said second position detector. In this case the control device may be adapted to interrupt the connection to the fluid supply source when a signal is received from this second position detector because such signal indicates a serious breakage in the conduit system. If the flow detector is dimensioned so that normal draining of fluid may also cause the piston to move to the said other position detector, the control device may be adapted to evaluate the permissibility of the flow intensity thus detected on the basis of one or more of the above mentioned criteria. The control device may be adapted to evaluate the permissibility of a fluid flow, which is detected by the receipt of a signal from said first piston position detector positioned closest to the piston seat, in a corresponding manner and based on the above criteria. As a possible leak which only causes movement of the piston to the said first position detector is less serious than breakage of the conduit which is detected by the transmittal of a signal from the said second position detector to the control device, it may also be sufficient to take less drastic measures, as for example by activating a sound or light signal. Furthermore, it may be justifiable to evaluate the permissibility of a fluid flow causing generation of a signal only from the first position detector on the basis of less strict criteria, for example based on a longer maximum continuous flow period than by evaluating the permissibility of the flow causing the generation of a signal from said second position detector.

In order to reduce the flow in the conduit system caused by pressure variations of the fluid supply source in connection with elasticity of the walls of the conduit system and by temperature variations in the conduit system, the flow detector may be adapted to function as a one-way valve which prevents fluid flow in the conduit system in the direction towards the fluid supply source.

In the present specification the terms "volume flow", "flow intensity", and "flow rate" have been used substantially as synonyms, because a certain, but arbitrary conduit system having a flow passage with a certain, but arbitrary cross-sectional area is being referred to.

BRIEF DESCRIPTION OF THE DRAWINGS

The invention will now be described more in detail with reference to the drawings, wherein FIG. 1 diagrammatically illustrates a conduit system with an embodiment of the system according to the invention for detecting leaks in the this conduit system.

DESCRIPTION OF THE PREFERRED EMBODIMENTS

Figure 1:
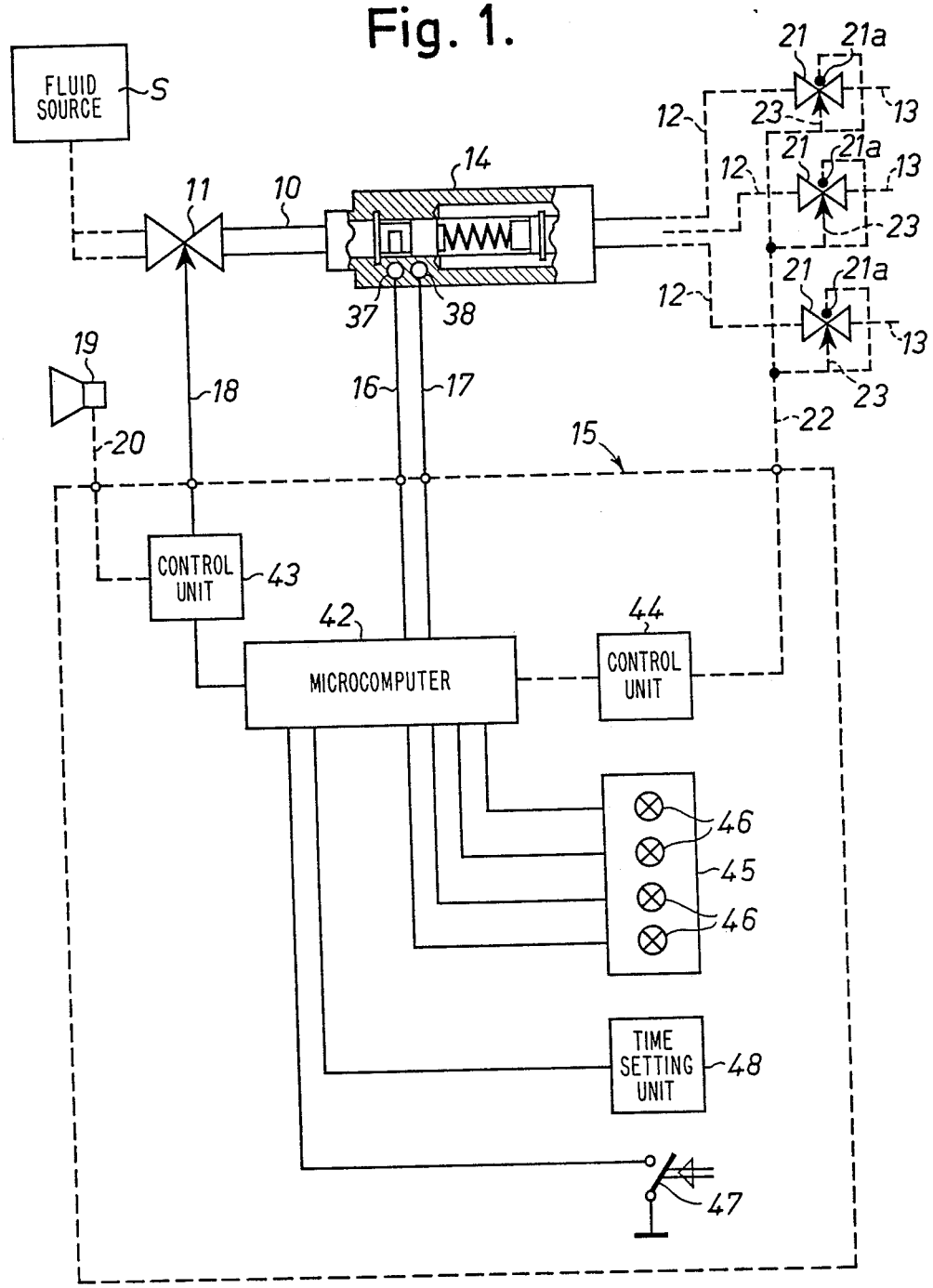

FIG. 1 illustrates a conduit system to which a fluid to be consumed, such as liquid or gas, for example water or gas for domestic use, is supplied from a fluid supply source S. The conduit system which may, for example, be water or gas supply lines in a one-family house or an apartment house comprises a main conduit 10 which is connected to the supply source S and provided with a closure valve 11, and the conduit system comprises a number of branched conduits 12 indicated by dotted lines in FIG. 1 and connecting the main conduit to respective fluid drains 13. The main conduit 10 also contains a flow detector which is generally designated by 14, and which will be described more in detail with reference to FIGS. 2–6. The system also comprises an electronic control device generally designated by 15 for evaluating on the basis of signals received from the flow detector 14 through conductors 16 and 17 whether there are any leakages in the conduit system 10,12 as described more in detail below. If such leak is detected the control device 15 generates a closure signal which is transmitted to the closure valve 11 through a conductor 18 so as to interrupt the communication with the fluid supply source S, and/or to activate an alarm device 19, such as a sound or light signal, through a conductor 20. As explained more in detail below the branched conduits 12 may also include closure valves 21 which may possibly also function as draining valves or taps at the fluid drains 13. The control device 15 is then connected to these valves 21 via conductors 22 and 23, and the control device 15 may either be adapted to transmit closure signals to the valves 21 at certain hours or at certain time intervals, or each of the valves 21 may be provided with a sensor 21a for transmitting signals to the control device 15 so as to indicate when all of the closure valves 21 in the branched conduits 12 are in their closed condition.

Figure 2:
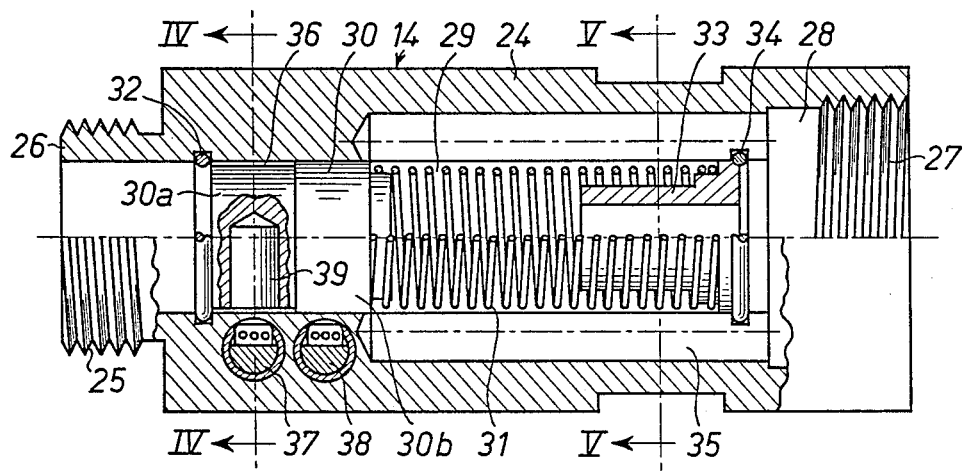
FIG. 2 is a side view and partially sectional view of an embodiment of a flow detector included in the system shown in FIG. 1.
Figure 3:
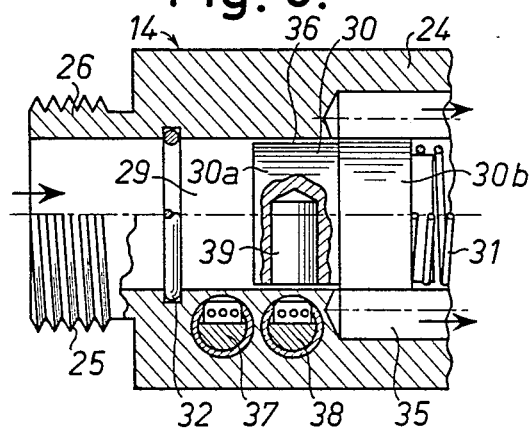
FIG. 3 is a side view and partially sectional view of the inlet end of the detector shown in FIG. 2, the parts of the detector being shown in a position they may occupy when fluid flows through the detector.

The flow detector shown in FIGS. 2–5 comprises a housing 24 having at one of its ends an inlet pipe stub 26 provided with external threads 25 and having at its opposite end an outlet 28 provided with internal threads 27. The inlet stub 26 and the outlet 28 are interconnected by an axial bore 29 in which a piston or valve member 30 is displaceable arranged and biased by a spring 31 towards an annular seat, which as shown in FIGS. 2 and 3 may be formed by an annular spring member 32 having its radially outer part received in an annular groove formed in the wall of the bore 29. The end of the spring 31 positioned adjacent to the outlet 28 surrounds a sleeve-like spring guide 33 which is prevented from axial movement towards the outlet 28 by means of an annular spring 34 received in an annular groove like the spring 32.

Figure 5:
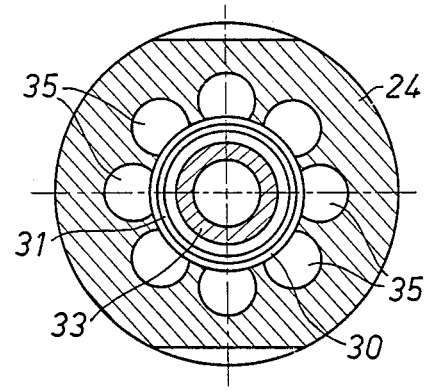
FIG. 5 is a sectional view along the line V—V in FIG. 2.
Figure 4:
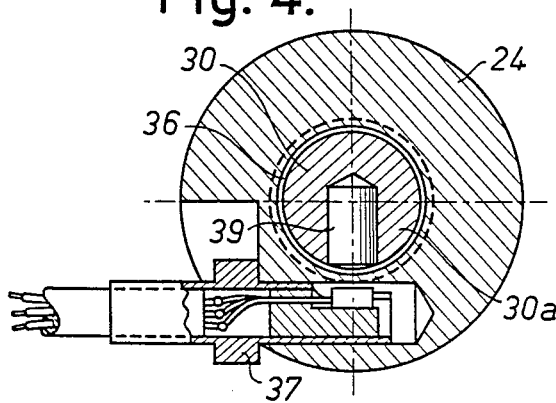
FIG. 4 is a sectional view along the line IV—IV in FIG. 2.

At the end portion of the housing 24 adjacent to the outlet 28 the cross-sectional area of the axial bore 29 is increased by means of a circular arrangement of smaller axial bores 35 surrounding the central bore 29 and communicating therewith in their total axial length, vide especially FIG. 5. The piston 30 has a stepped axial section as the end portion 30a thereof positioned closest to the seat or annular spring 32 has a diameter which is somewhat smaller than the diameter of the piston end portion 30b located closest to the spring 31. While the diameter of the piston portion 30b corresponds almost to the diameter of the central bore 29 in which the piston 30 is displaceably arranged, the piston portion 30a and the wall of the bore 29 define an annular space 36 therebetween. In the part of the housing 24 adjacent to the inlet stub 26 two detectors or sensors 37 and 38 for detecting or sensing the axial position of the piston 30 in the bore 29 are mounted with a mutual axial spacing. These detectors may, for example, be in the form of magnetic sensors, such as sensors based on the Hall-effect or reed relays, and in this case the piston may be provided with a permanent magnet member 39 which may be received in a radial bore as shown in FIGS. 2–4.

The flow detector shown in FIGS. 2–5 operates in the following manner:

When no fluid is flowing through the flow detector 14 the piston or valve member 30 will be in the position shown in FIG. 2 in which the piston portion 30a with the reduced diameter is in engagement with the annular spring 32, while the peripheral surface of the piston portion 30b is in substantially sealing engagement with a surrounding wall portion of the central bore 29 which is not penetrated by the smaller axial bores 35. In this position of the piston 30 the magnet member 39 is located in the same radial plane as the position detector 37 so that this detector is activated and generates a signal so as to indicate that there is no substantial fluid flow through the axial bore 29 of the flow detector, which means that neither drainage of fluid at the fluid drains 13 nor leaking of fluid through leaks in the conduit system 10,12 with the flow detector 14 is taking place.

When fluid is drained from the system at one or more of the fluid drains 13 and/or when fluid is escaping through a leak in the conduit system, the pressure drop which is hereby created across the piston 30 causes the piston to move to the right in FIG. 2 against the pressure excerted by the spring 31. Thereby, the piston 30 will be moved to the position shown in FIG. 3 in which the annular space 36 defined between the piston portion 30a and the wall of the bore 29 is in direct communication with the bores 35. Fluid may then flow from the inlet stub 26 through the annular space 36 and the bores 35 to the outlet 28. In the position shown in FIG. 3 the magnet member 39 is located in the same radial plane as the position detector 38 which is thereby activated so as to generate a signal indicating that the piston is in a position in which a moderate flow of fluid is escaping from the conduit system due to drainage of fluid or a leak in the system.

If a relatively large pressure drop is created across the piston 30 because all or a substantial number of the fluid drains 13 are opened simultaneously and/or because of a breakage in the conduit system the piston 30 will be moved into the portion of the central bore 29 which is surrounded by the smaller axial bores 35, whereby direct communication is established between the inlet of the flow detector and the bores 35. None of the position detectors 37 and 38 will then generate a signal which indicates that fluid is removed from the conduit system in a rather vigorous flow.

It should be understood that the piston 30 could be divided into even more axial sections having different diameters, and a correspondingly greater number of piston position detectors might be used whereby it would be possible to obtain still more detailed information about the intensity of the fluid flow through the flow detector.

As mentioned previously, a minor fluid flow through the flow detector may occur when no fluid is drained from the conduit system and no fluid is escaping through leaks, because of pressure variations at the fluid supply source, elasticity in the walls of the conduit system, thermal changes, etc. Therefore, a minor controlled leak may be provided between the piston portion 30b and the wall of the central bore 29, if desired, so as to prevent the detector from reacting on such minor fluid flow.

Figure 6:
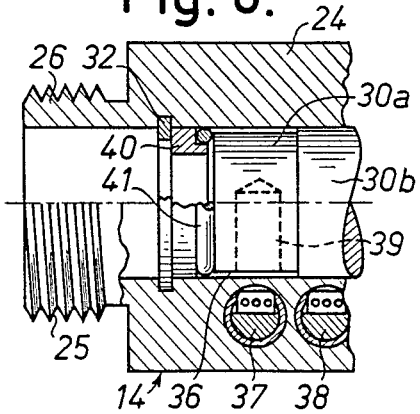
FIG. 6 is a side view and partially sectional view of a modified embodiment of the inlet end of the detector shown in FIGS. 2–5.

The sensitivity of the detector to such minor flows not caused by escape of fluid from the conduit system may be reduced by forming the annular seat of the piston 30 as shown in FIG. 6. In this embodiment the seat comprises not only the annular spring 32, but also an abutment ring 40 having a sealing ring 41 mounted at its inner end. This sealing ring, for example an O-ring, is in sealing engagement with the end surface of the piston 30, when the piston is in the starting position shown in FIG. 2. This means that the piston functions as a one-way valve preventing fluid flow in the direction from the fluid drains 13 towards the fluid supply source S.

The electronic control device 15 shown in FIG. 1 includes a microcomputer 42 which may receive signals from the piston position detectors 37 and 38 via the conductors 16 and 17 which may control the closure valve 11 and/or the alarm device 19 via a control unit 43. Furthermore, the computer 42 may control the closure valves 21 through a control unit 44 or, alternatively, sense their condition (open or closed) by means of the sensors 21a. The control device 15 also includes an amplifying unit 45 connected to the computer 42 and having a number of indicating lamps 46 for indicating the operating condition of the system, such as the intensity of the fluid flow through the flow detector 14. The control device 15 also includes a manually operatable swtich 47 by means of which the alarm function of the control device may be made inoperative for a predetermined period of time, for example in 12 hours, or in a period of time which may be set by means of a time setting unit 48.

On the basis of the signal received by the microcomputer 42 from the position detectors 37 and 38 of the flow detector 14 and on the basis of predetermined criteria, the computer evaluates whether a detected fluid flow at a certain intensity through the flow detector 14 should be judged non-permissible, i.e. caused by leakage or breakage in the system, and in the affirmative the alarm device 19 is operated via the control unit 43 and/or the fluid supply from the fluid supply source S is interrupted by closing the closure valve 11. The evaluation of permissibility of the flow may, for example, be based on the criteria whether the duration of the flow exceeds a predetermined period of time corresponding to a maximum drainage period at the fluid drains 13. In that case the microcomputer 42 starts measuring of time as soon as a signal is received from the position detector 38, i.e. when the piston 30 of the flow detector 14 is in the position shown in FIG. 3. When and if the signal generated by the position detector 38 stops and is followed by a signal received from the detector 37, which means that the fluid flow has been terminated, the time measuring of the computer is terminated. The period of time in which a fluid flow is permitted without operating the alarm device or interrupting the supply of fluid may be set by means of the time setting unit 48.

The computer 42 is preferably adapted so as to tolerate a fluid flow through the flow detector 14 in a shorter period of time when the flow intensity is high, i.e. when the magnet member 39 has been moved to the right beyond the position detector 38, than when the piston 30 is in the position shown in FIG. 3.

The microcomputer 42 may, alternatively or additionally, be adapted to close all the valves 21 rather shortly via the control unit 44 at certain predetermined hours so as to render it impossible to drain fluid from the fluid drains 13. If the fluid detector 14 detects a fluid flow while these valves 21 are closed the computer 42 must operate the alarm device. The closure valves 21 may possibly be the normal draining valves or taps, and these may then be provided with sensors 21a as described above for transmitting a signal to the computer 42 for indicating when the valves are closed. The computer may then be adapted to make the leak detection each time all the valves 21 are closed simultaneously.

Sometimes fluid is drained from one or more of the fluid drains 13 in a period of time which exceeds the time period which is considered to be maximum under normal conditions. If the conduit system forms part of a water supply system such a situation may for example occur by lawn sprinkling, car washing, etc. In order to avoid that the computer 42 operates the alarm in such case the operator may actuate the switch 47 prior to such long lasting fluid drainage and thereby cancel operation of the alarm for a longer, predetermined period of time, for example 12 hours.

It should be understood that various changes and modifications of the embodiments shown in the drawings may be made within the scope of the present invention. As an example, the flow detector 14 need not be adapted to detect different levels of flow intensity, but need only be able to detect whether flow takes place or not. This is especially true when the computer is adapted to make the leakage evaluation, when it has been ascertained that all of the fluid drains of the conduit system are closed.

I claim:

1. A method of detecting leakage in a conduit system communicating with a supply source of a pressurized fluid to be consumed and having at least one selectively operable fluid drain, said method comprising:
    A. detecting by means of a flow detector capable of detecting possible fluid flows exceeding at least two predetermined flow values, at at least one location of the conduit system, a possible fluid flow exceeding a predetermined first value and a possible fluid flow exceeding a predetermined second value, substantially greater than said first value;

B. supplying from said flow detector to a control device a first detecting signal, when a fluid flow exceeding said first value has been detected, and a second detecting signal when a fluid flow exceeding said second value has been detected by said flow detector;

C. supplying a first emergency signal from said control device, when the duration of said first detecting signal has uninterruptedly exceeded a predetermined first period of time, and D. supplying a second emergency signal from said control device when the duration of said second detecting signal has exceeded a predetermined second period of time which is substantially shorter than said first period.

2. A method according to claim 1, wherein at least one of said first and second emergency signals is transmitted to a shut-off valve arranged in said conduit for causing said valve to shut-off said conduit.

3. A method according to claim 2, wherein the said first emergency signal activates an alarm device.

4. A method according to claim 1, wherein said second flow value exceeds the flow value when all of the fluid drains of the conduit system are fully open.

5. A leakage detecting system for detecting a leakage in a conduit system, which communicates with a supply source of a pressurized fluid to be consumed and includes at least one selectively operable fluid drain, said detecting system comprising:

A. a flow detector arranged in said conduit system upstream of said fluid drain including at least two signal generating means, a first signal generating means for generating a first detecting signal when a fluid exceeding a predetermined first value has been detected by the flow detector, and a second signal generating means for generating a second detecting signal, when a fluid flow exceeding a predetermined second value which is substantially higher than the first value has been detected by said flow detector;

B. a control device electrically connected to the flow detector so as to receive the first and second detecting signals therefrom, said control device being adapted to generate a first emergency signal when the duration of said first detecting signal has uninterruptedly exceeded a predetermined first period of time, and a second emergency signal, when the duration of said second detecting signal has uniterruptedly exceeded a second period of time which is substantially shorter than the first period; and C. emergency means electrically connected to said control device and actuatable by the emergency signals.

6. A system according to claim 5, wherein said emergency means comprise a shut-off valve for shutting off the conduit system from the supply source.

7. A system according to the claim 5, wherein said flow detector comprises a valve member or piston which is slideably arranged within a cylinder and biased by a return member in a direction opposite to the normal direction of the fluid flow within the conduit system and into contact with an abutment or seat formed within the cylinder, a first piston position detector for detecting when said piston is in a first position at the seat, and in a second piston position detector for detecting when the piston has been moved from the seat to a second position where the cross-sectional area of the cylinder opening exceeds that at the first position.

8. A system according to claim 7, wherein the piston includes axial sections having different diameters or cross-sectional areas.

9. A system according to claim 7 wherein the flow detector is adapted to function as a non-return valve preventing fluid flow in the conduit system in a direction towards to the fluid source.

* * * * *